UNITED STATES PATENT OFFICE.

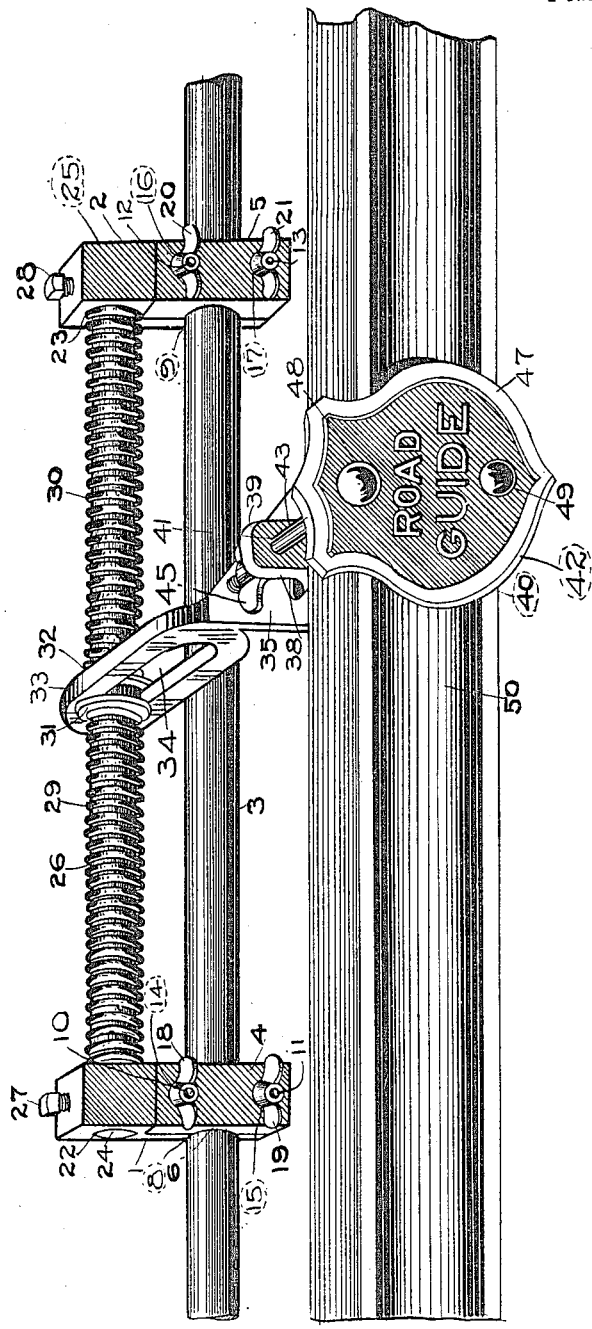

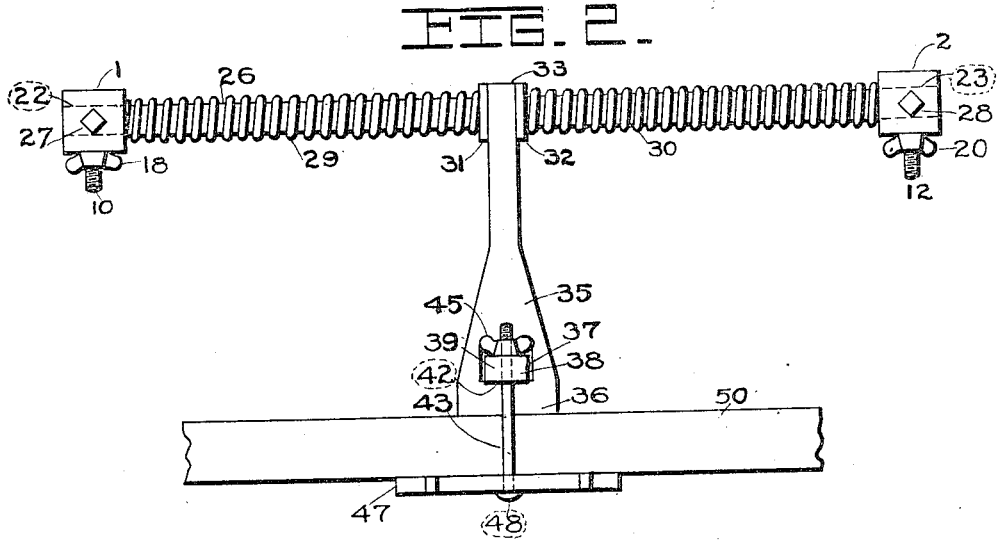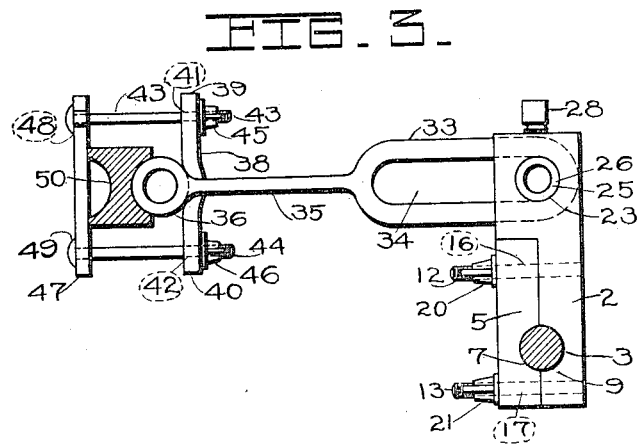

JOHN A. KITTLE, OF ST. LOUIS, MISSOURI.

AUTOMOBILE-STABILIZER.

1,210,490.  Specification of Letters Patent.  Patented Jan. 2, 1917.

Application filed August 4, 1915. Serial No. 43,518.

*To all whom it may concern:*

Be it known that I, JOHN A. KITTLE, a citizen of the United States, residing in the city of St. Louis and State of Missouri, have invented a new and useful Improvement in Automobile-Stabilizers, of which the following is a specification.

My invention relates to improvements in devices for normally maintaining an automobile or similar vehicle in a direct and approximately straightforward course without the necessity of the driver paying constant attention to the steering mechanism, and the main object of my invention is to produce an attachment to be applied to the front axle and steering rod of an automobile which will normally hold the tread of the front wheels of the vehicle in direct and approximately straight alinement with the tread of the rear wheels, at the same time permitting said front wheels to be readily turned to either side through the operation of the ordinary steering mechanism whenever it may be desired to deviate from such straight ahead course.

Another object of my invention is to produce such device in a cheap, strong and efficient form and which may be readily attached to or detached from the vehicle as required.

It is well known that by far greater proportion of automobile driving is done in direct and approximately straight lines straight ahead. It is also well known that the slightest inattention upon the part of the driver may result in the front wheels swerving or "jack-knifing", which often results in accidents, and the object of my invention is to guard against these contingencies by producing an attachment which will automatically hold the vehicle in its course without the constant attention of the driver, while at the same time permitting the vehicle to be turned to either side when necessary.

I attain these objects by the mechanism illustrated in the accompanying drawings, in which—

Figure I is a perspective frontal view of the attachment as a whole. Fig. II is a top plan view, and Fig. III is a side elevation.

Similar figures refer to similar parts throughout the several views.

My improved attachment consists of the two uprights 1 and 2 mounted upon the ordinary steering rod 3 of an automobile. The clamp blocks 4 and 5 are mortised from the main uprights 1 and 2 as shown. Semi-circular transverse grooves 6 and 7 are formed upon the inner surfaces of said clamp blocks and corresponding semi-circular transverse grooves 8 and 9 are formed upon the inner surfaces of the uprights 1 and 2. Threaded bolts 10, 11, 12 and 13 project from the uprights 1 and 2 at points above and below semi-circular grooves 8 and 9, and pass through corresponding holes 14, 15, 16 and 17 formed through the clamp blocks 4 and 5. Wing nuts 18, 19, 20 and 21 are fitted to the threads of said bolts. The holes 22 and 23 are formed transversely through the uprights 1 and 2 at the upper portion thereof as shown, for the purpose of receiving the ends 24 and 25 of the trunnion 26, and the ends 24 and 25 are securely locked in position by means of the set screws 27 and 28. Two duplicate coiled steel springs 29 and 30 are adjusted over the trunnion 26 at either end thereof, and at their point of juncture are set the washers 31 and 32. Between the washers 31 and 32 works the guide head 33, which is mounted upon the trunnion 26 through the slot 34 formed through said guide head. A forwardly and laterally spreading wing 35 projects from the guide head 33 and takes at its forward extremity the form of the horizontal tube 36 adapted to set into and engage with the forward axle 50 of the vehicle. Just back of the tube 36 is the slot 37 through which passes the vertically positioned clamp 38, the upper and lower ends 39 and 40 of which are pierced with the holes 41 and 42. Through the holes 41 and 42 extend the bolts 43 and 44, which bolts are provided with the wing nuts 45 and 46 and extend forwardly and engage with the front plate 47 through the holes 48 and 49 formed at the proper points through said front plate 47. It will be noted that the front plate 47 is in engagement with front of the axle 50, while the tube-like portion 36 is in counterengagement with the reverse side of the axle. It will be noted that by turning up the wing nuts 45 and 46 any degree of pressure may be brought to bear upon the axle 50 and the attachment thereby locked in firm and rigid position. It will be noted that the uprights 1 and 2 may likewise be locked in secure and rigid position upon the steering rod 3 by properly placing the uprights upon the steering rod, adjusting the block clamps 4 and 5 to the projecting bolts 10, 11, 12 and 13 and turning down the wing nuts 18, 19, 20 and 21 to the required degree.

In actual use this attachment is adjusted to the axle and the steering rod of the automobile at the exact central portions thereof, so that the guide head 33 rests exactly over the center point of the guide rod 3, and the front plate 47 bears upon the exact center point of the axle 50. It will be seen that when so positioned the effect of the coil springs 29 and 30 is to bear equally upon the guide head 33 from opposite sides and so as to hold said guide head 33 in a normal, central position, but it will likewise be seen that the resilient qualities of the springs 29 and 30 will readily permit said guide head 33 to be moved to either side along the trunnion 26 as may be required for the purpose of steering the vehicle to one side or the other. It will likewise be seen that when pressure is removed which forces the said guide head 33 to one side or the other along the trunnion 26, the said guide head 33 will through the action of the coil springs 29 and 30 automatically return to its normal, central position upon the trunnion 26, thereby carrying with it the steering rod 3 to a like central position, the result of which is to bring the tread of the front wheels of the vehicle into direct alinement with the tread of the rear wheels and so as to throw the normal course of the vehicle in a direct line straight ahead.

While I have herein described a certain method of constructing and assembling the elements of my invention, it is understood that I may vary the construction in minor details not departing from the spirit of my invention.

Having thus described my invention what I claim to be new and patentable is:

1. In a device of the class described, the combination with the steering rod and front axle of an automobile, of two upright blocks fitted in separated position upon the steering rod, a spring supporting bar extending between the upper portions of said blocks and in vertical parallelism with said steering rod; two duplicate coil springs loosely mounted on said bar, a guide head having a slot at one end through which the supporting bar extends, said guide head being adapted to be interposed between the inner ends of the springs, and a tubular opposite end adapted to engage the front axle, a front plate and means for clamping the tubular end of the guide head and the front plate upon opposite sides of the axle.

2. In a device of the class described, the combination with the steering rod and front axle of an automobile, of two upright blocks fitted in separated position upon the steering rod, a spring supporting bar extending between the upper portions of said blocks and in vertical parallelism with said steering rod, said blocks being in separable portions with the lower portions fitted on the steering rod, means for detachably securing the portions of said blocks together, two duplicate coil springs loosely mounted on said bar, a guide head having a slot at one end through which the supporting bar extends, said guide head being adapted to be interposed between the inner ends of the springs, and a tubular opposite end adapted to engage the front axle, a front plate and means for clamping the tubular end of the guide head and the front plate upon opposite sides of the axle.

JOHN A. KITTLE.

Witnesses:
S. L. COLESWORTHY,
ADELE DOHLE.

Copies of this patent may be obtained for five cents each, by addressing the "Commissioner of Patents, Washington, D. C."